US007128076B2

(12) United States Patent
Freedman

(10) Patent No.: US 7,128,076 B2
(45) Date of Patent: Oct. 31, 2006

(54) AUTOMATED CANOPY POSITIONING SYSTEM

(75) Inventor: Rashell Freedman, Nepean (CA)

(73) Assignee: Twisted Innovations, Nepean (CA)

( * ) Notice: Subject to any disclaimer, the term of this patent is extended or adjusted under 35 U.S.C. 154(b) by 45 days.

(21) Appl. No.: 10/338,867

(22) Filed: Jan. 9, 2003

(65) Prior Publication Data

US 2004/0134526 A1   Jul. 15, 2004

(51) Int. Cl.
   *A45B 11/00*   (2006.01)
(52) U.S. Cl. .................... 135/20.3; 250/203.4
(58) Field of Classification Search .............. 135/20.3, 135/15.1, 16, 20.1, 910, 98, 121, 96, 905; 250/221, 222.1, 203.3, 203.4; 362/102; 136/243, 136/246, 291
   See application file for complete search history.

(56) References Cited

U.S. PATENT DOCUMENTS

| | | | | | |
|---|---|---|---|---|---|
| 1,683,270 | A | * | 9/1928 | Taylor et al. | 343/869 |
| 2,496,769 | A | * | 2/1950 | Battle | 135/20.3 |
| 4,107,521 | A | * | 8/1978 | Winders | 250/203.4 |
| 4,320,288 | A | * | 3/1982 | Schlarlack | 250/203.4 |
| 4,672,191 | A | * | 6/1987 | Cofield | 250/203.4 |
| 4,868,379 | A | * | 9/1989 | West | 250/203.4 |
| 4,922,088 | A | * | 5/1990 | Kasuya | 250/203.4 |
| 5,339,847 | A | * | 8/1994 | Kanter et al. | 135/16 |
| 5,441,068 | A | * | 8/1995 | Rasch et al. | 135/98 |
| 5,727,583 | A | * | 3/1998 | Kennedy | 135/20.1 |
| 6,761,180 | B1 | * | 7/2004 | Lai | 135/20.3 |
| 2002/0179822 | A1 | * | 12/2002 | Breed et al. | 250/221 |
| 2003/0051747 | A1 | * | 3/2003 | Lai | 135/15.1 |
| 2003/0192579 | A1 | * | 10/2003 | Llamas Garijo | 135/16 |
| 2004/0094691 | A1 | * | 5/2004 | Redler et al. | 250/203.3 |
| 2004/0107979 | A1 | * | 6/2004 | Lai | 135/20.3 |
| 2004/0149325 | A1 | * | 8/2004 | Kuelbs | 135/20.3 |

* cited by examiner

*Primary Examiner*—A. Joseph Wujciak, III
(74) *Attorney, Agent, or Firm*—Freedman & Associates

(57) ABSTRACT

An automated canopy positioning system for providing solar protection is disclosed. The automated canopy positioning system orients the canopy of the umbrella in relation to the sun so that a shade at a predetermined location is provided thereunder. The system has a canopy for providing shade in response to light impacting the upper surface, a first photodetector for detecting the amount of light in the shaded area and for generating a photocurrent in response to the light incident thereon, a control circuit for receiving the photocurrent and for generating a control signal in dependence thereon, and a positioning mechanism coupled with the canopy for spatially orienting the canopy in response to the control signal.

14 Claims, 10 Drawing Sheets

AUTOMATED CANOPY POSITIONING SYSTEM

FIELD OF THE INVENTION

The invention relates to the area of solar protection coverings and more specifically to the area of automated canopies that provide solar protection.

BACKGROUND OF THE INVENTION

Skin cancer has become an increased concern due to the depletion of the ozone layer, which protects people from the sun's harmful UV rays. Thus, in order to provide protection from the sun, people now use umbrellas not only to keep themselves dry from rain but also to provide shade from the harmful effects of the sun. Solar umbrellas for providing shade are quite prevalent on patios and other outdoor facilities.

Of course, sunscreens can optionally be applied by individuals to block the harmful UV rays, however in some cases this may not be a preferable option, especially when very young infants or those with allergies are involved. Since the chemicals in the sunscreens may react adversely with the skin of young infants or those with allergies. Young infants are especially susceptible to harmful UV rays when they are pushed around in a stroller by their parents. Thus, the strollers are typically equipped with sun shades that are spatially oriented by parents in such a manner to provide sun protection to the infant.

Unfortunately, as the stroller is moved, the spatial orientation of a sun shade must typically be varied in order to maintain shade on the infant. Thus, as the stroller is wheeled around the position of the shade on the infant changes; and as a result the parents have to stop pushing the stroller and they have to reposition the sun shade in order to maintain their infant in the shade cast by the sun shade.

A need therefore exists for providing an umbrella, which offers solar protection in a shadow cast therefrom, and one that does not require constant manual repositioning as a result of the orientation of the sun changing with respect to the canopy. It is therefore an object of the invention to provide an automated positioning system for a canopy of an umbrella that varies its position in an automated manner to facilitate providing of a shaded area at a predetermined location as the orientation of the sun varies with respect to the canopy.

SUMMARY OF THE INVENTION

In accordance with the invention there is provided a method of spatially orienting a canopy comprising the steps of: detecting an orientation of a light source relative to the canopy; moving of the canopy in dependence upon the detected orientation, the canopy positioned for providing a shade under the canopy; and, maintaining the shade about an approximately predetermined location relative to which the canopy is moved.

In accordance with the invention there is also provided an apparatus comprising: a canopy having an upper surface and a lower surface for providing shade to a shaded area opposing the lower surface in response to light impacting the upper surface; a first photodetector for detecting at least one of an amount of light in the shaded area and an amount of light impacting the canopy upper surface, the detector for generating a photocurrent in response to light incident thereon; a control circuit for receiving the photocurrent and for generating a first control signal in dependence thereon; a positioning mechanism having a fixed portion and having a moving portion coupled with the canopy for spatially orienting the canopy relative to the fixed portion about at least an axis in response to the control signal for, in use, maintaining at least a portion of the shaded area in an approximately predetermined spatial orientation relative to the fixed portion.

BRIEF DESCRIPTION OF THE DRAWINGS

Exemplary embodiments of the invention will now be described in conjunction with the following drawings, in which:

FIG. 2b illustrates a resilient portion provided with the prior art umbrella shown in FIG. 2a;

DETAILED DESCRIPTION OF THE INVENTION

Figure 1:
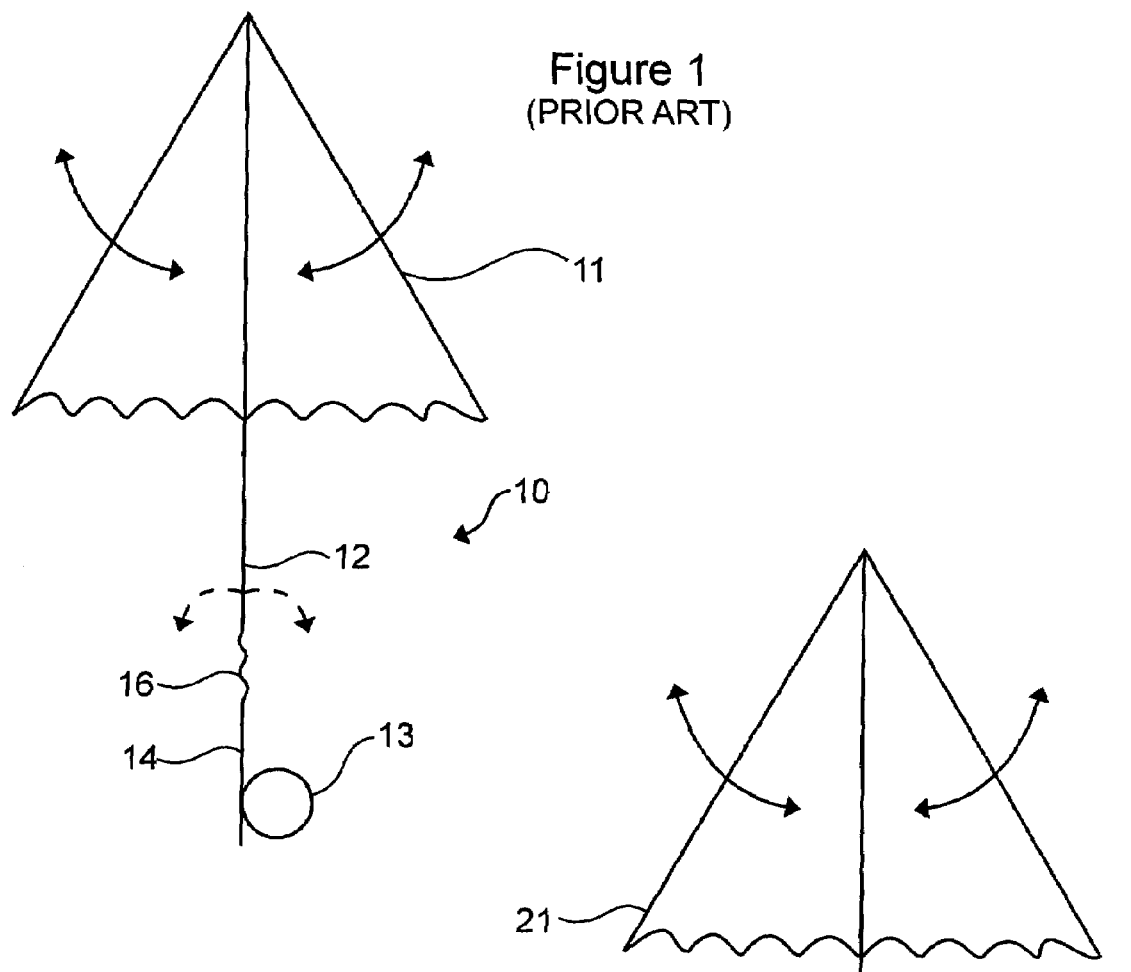
FIG. 1 illustrates a prior art solar umbrella.

In FIG. 1a, a prior art solar umbrella 10 is shown. The umbrella 10 includes a canopy 11, for providing shade from the sun, an umbrella shaft 12, and a mechanism (not shown) for allowing movement of the canopy between an open and a closed position. In the open position the canopy provides shade from the sun, and in the closed position the canopy other than substantially provides shade from the sun. The umbrella shaft 12 is coupled to a resilient portion 16, which is further coupled to a mounting portion 14 for rigidly mounting to a frame member 13, through the use of a clamping mechanism (not shown). The frame member 13 forms part of a stroller (not shown). The resilient portion 16 is of a type that facilitates maintaining of the spatial orientation of the umbrella shaft 12 with respect to the mounting portion 14 in response to a force applied to the umbrella shaft, where the force is sufficient to overcome the resiliency of the resilient portion 16. Thus, the resilient portion 16 is movable or malleable to set the spatial orientation of the canopy 11 and to maintain the spatial orientation of the canopy 11 with respect to the frame member 13 during normal use.

For instance, when the wind blows the resilient portion 16 allows for some movement of the canopy 11 with respect to the frame member 13 as a result thereof. However, it approximately maintains the spatial orientation of the canopy 11 with respect to the frame member 13, unless a sufficient force is applied to the umbrella shaft 12 to overcome the resiliency in order to re orient the canopy 11 with respect to the frame member 13. Thus, when the clamping mechanism (not shown) is fixedly mounted to the frame member 13 as part of a stroller, the umbrella shaft 12 is manually repositioned in such a manner that the canopy 11 provides shade to a shaded area in which, for instance, an infant is seated in the stroller.

Effectively, the canopy blocks a portion of the harmful UV rays impacting on the shaded area. Unfortunately, as the orientation of the stroller changes with respect to the sun, the spatial orientation of the canopy 11 must be manually varied in order to re-orient the canopy 11, such that the shaded area remains shaded.

Figure 2A:
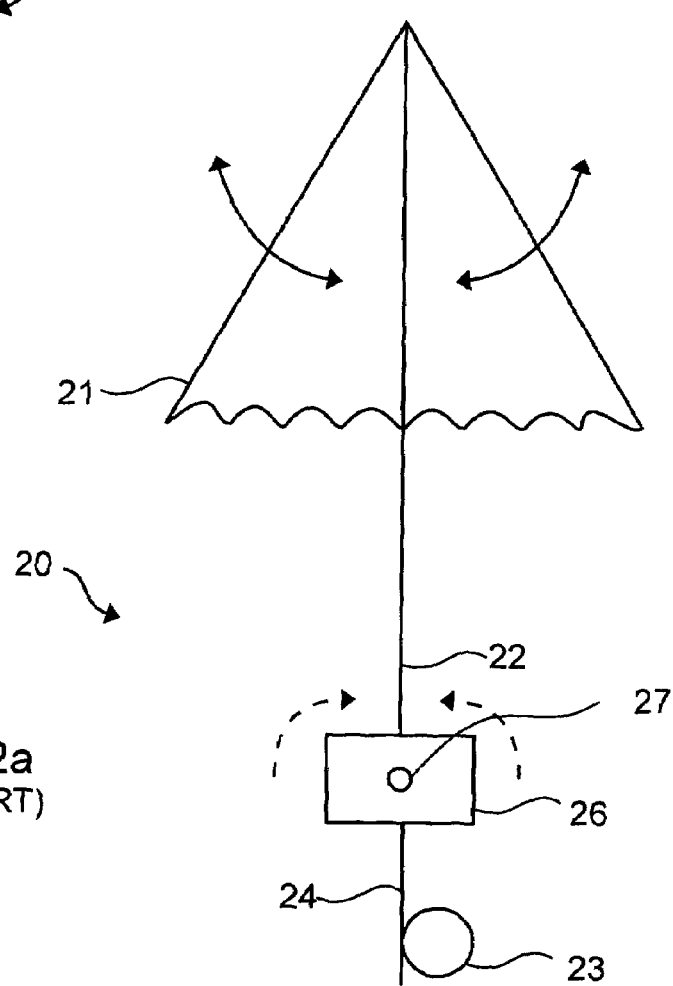
FIG. 2a illustrates a prior art variation of a solar umbrella.

Prior art FIG. 2a illustrates a variation of a solar umbrella 20. The umbrella 20 has a canopy 21 and an umbrella shaft 22. The umbrella shaft 22 is coupled to a moving portion (not shown) of a pivot component 26 having a moving portion and a fixed portion 24. The fixed portion of the pivot component 26 is for rigidly mounting to a frame member 23 in the form of part of a stroller (not shown). The pivot component is a single axis pivot component 26, of a design for facilitating movement of the umbrella shaft 22 with respect to the fixed portion 24 about a single axis. The pivot allows for vaying the spatial orientation of the canopy 21 with respect to the frame member 23 in response to loosening of a nut 27, releasably engaged on a thread. The nut is for selectively frictionally engaging the moving portion with respect to the fixed portion 24 of the pivot component 26. Thus, by loosening of the nut 27, the canopy 21 is manually variably spatially orientable with respect to the fixed portion 24 in a spatial orientation about the single axis. Afterwards the nut 27 is tightened to fix the spatial orientation of the canopy 21 with respect to the fixed portion 24.

Figure 2B:
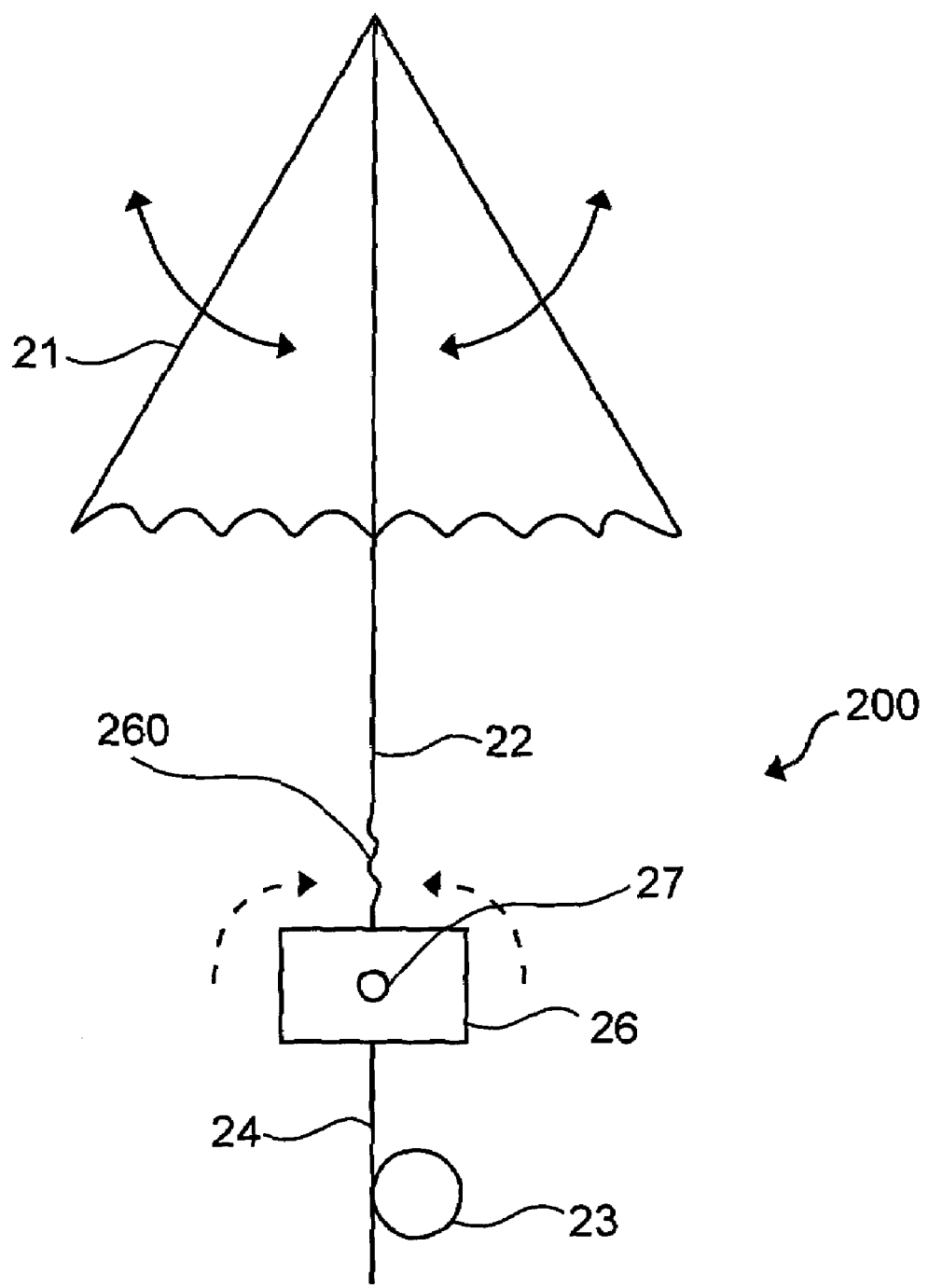

In accordance with prior art FIG. 2b, shown is a solar umbrella 200, a resilient portion 260 is provided between the umbrella shaft 22 and the pivot component 26 in order to facilitate movement of the canopy 21 in response to external forces such as wind, as well as to facilitate spatial orientation of the canopy. The resilience is selected to maintain the canopy 21 with respect to the fixed portion 24 about at least one axis Unfortunately, as the stroller is moved with respect to the sun, periodic variations in the spatial orientation of the canopy 11 and 21 must be manually performed in order to ensure that the shaded area thereby provided encompasses the infant. Furthermore, if the solar umbrella is for instance used to provide shade to a fixed object in the form of a table, then movement of the sun with respect to the table also causes the shaded area under the canopy to vary in position relative to the fixed object and thus manual reorienting of the canopy is necessary to ensure that the shaded area under the canopy is at a desirable spatial orientation.

Figure 3:
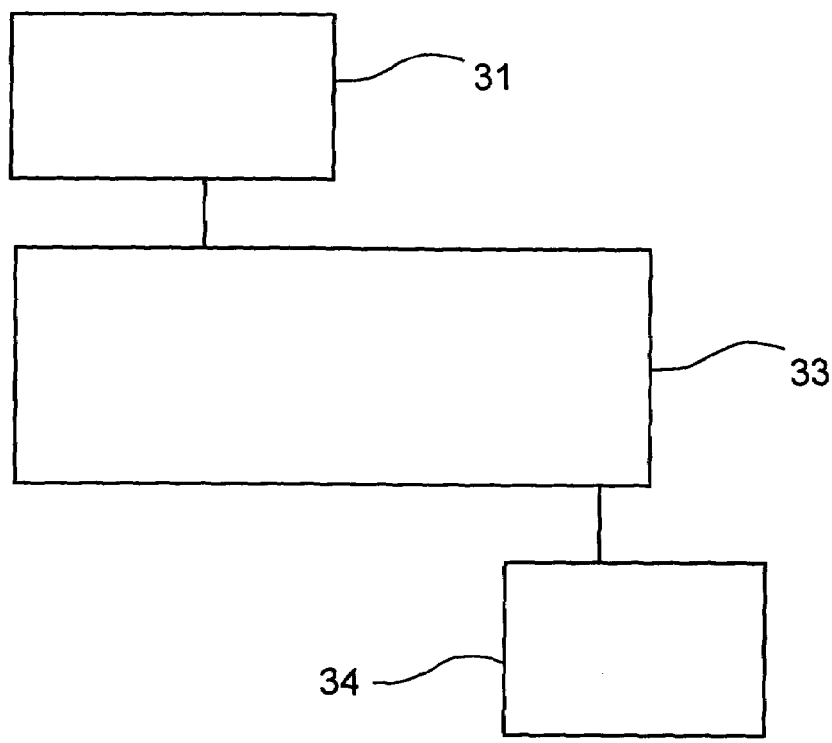
FIG. 3 illustrates a circuit for use with an embodiment of the invention.

FIG. 3 illustrates a circuit for use with an embodiment of the invention. The circuit uses a first photodetector 31 to receive light and to generate a photocurrent in response thereto. The photocurrent generated by the photodetectors is received by a control circuit 33, which is further coupled to an actuator 34. The control circuit comprises circuitry which determines, from the received photocurrent, a magnitude of light energy impacting on the surface of the photodetector 31. In dependence on the magnitude of the light energy, a control signal is generated by the control circuit. The control signal is provided to the actuator, wherein the control signal has at least a polarity and preferably is also characterized by a magnitude.

Figure 4:
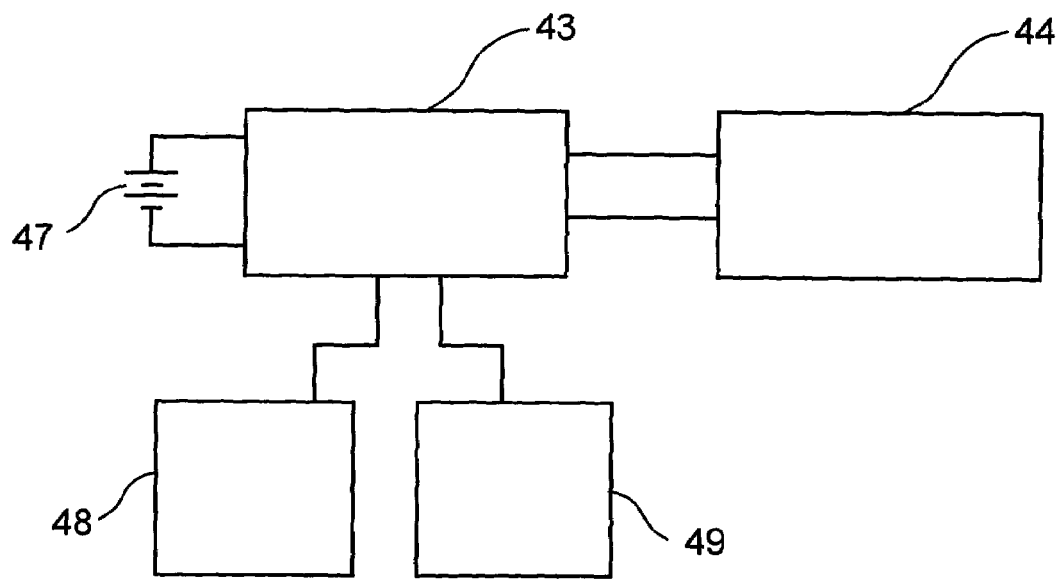
FIG. 4 illustrates a variation of a circuit for use with an embodiment of the invention.

FIG. 4 illustrates a variation of the circuit for use with an embodiment of the invention. The circuit uses first and second photodetectors 48 and 49 to receive light, the first and second photodetectors 48 and 49 for generating photocurrents in response thereto. Both photocurrents, provided by the photodetectors, are received by a control circuit 43, which is further coupled to an actuator 44. The control circuit 43 comprises circuitry that determines from the received photocurrents a relative magnitude of light energy impacting on the surface of each of the photodetectors 43, 44. In dependence upon the relative magnitude of the light energy, a control signal is generated and provided to the actuator 44. The control signal has at least a polarity and preferably also has a variable magnitude. Thus when the first photodetector 48 receives more light energy than the second photodetector 49 the control signal has a first polarity, and when the first photodetector 48 receives less light energy than the second photodetector 49 the control signal has a second other polarity. The first and second polarities each in response thereto result in the actuator 44 moving in different directions being a first direction and a second other direction, respectively.

Optionally, the circuit is solar powered using at least a solar cell 47. As is evident to those of skill in the art, since the canopy is for use in providing shade, sun energy is typically incident on an upper surface of the canopy during use and, as such, placement of solar cells is straightforward. The control circuit additionally has a circuit that stores electrical energy received from the solar cell in an energy storage medium in the form of a capacitor or a rechargeable battery. Further optionally, the photodetectors act as solar cells and photocurrent therefrom is used to charge an energy storage circuit that is then used to power movement of the actuator in either the first direction or the second other direction.

Figure 5:
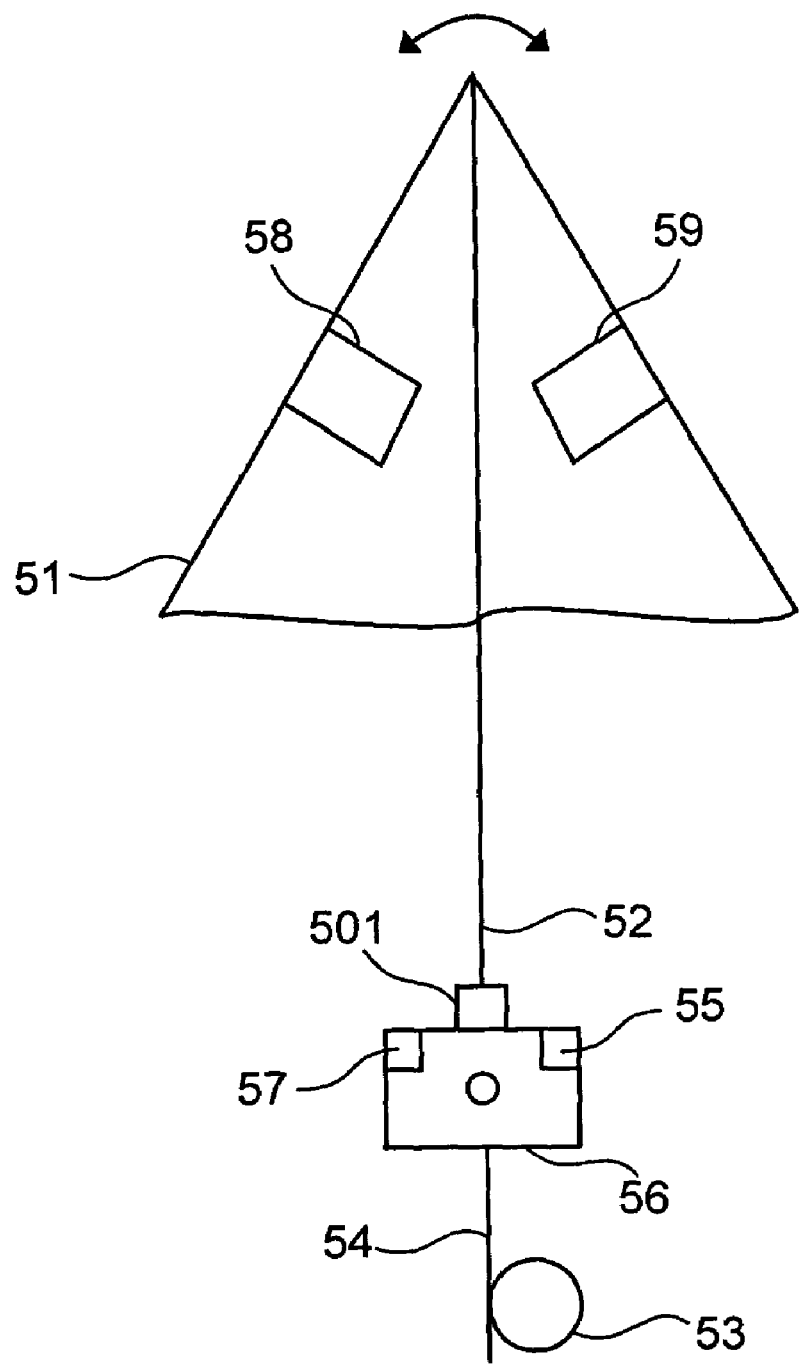
FIG. 5 illustrates an embodiment of the invention.

In FIG. 5, an embodiment of the invention is shown that utilizes the circuit featured in FIG. 4. In this embodiment an umbrella is provided, the umbrella has a canopy 51 and an umbrella shaft 52. The umbrella shaft 52 is coupled to a moving portion 501 of a pivot component 56 having the moving portion 501 and a fixed portion 54. The moving portion 501 is disposed proximate an end of the umbrella shaft opposite the canopy 51. The fixed portion 54 of the pivot component 56 is for rigid mounting to a frame member 53. The frame member 53 is for example part of a vehicle, preferably in the form of a stroller (not shown) or part of a stationary object, such as a table. Of course, the rigid mounting may be other than rigidly coupled to the frame member 53.

The circuit assembly has first and second photodetectors 58 and 59, preferably disposed about an outer surface of the canopy 51, electrically coupled to a control circuit 57 for providing a control signal to an actuator 55. Thus in response to a control signal generated by the control circuit 57, the canopy 51 is spatially oriented about a first axis with respect to the fixed portion 54 by the actuator 55. The pivot component is preferably at least a single axis pivot component 56 for supporting actuated movement of the umbrella shaft 52 with respect to the fixed portion 54 about at least a single axis with the actuator 55 and circuit assembly as shown in FIG. 4. Movement about the at least a single axis results in the canopy sweeping out a first arc when the canopy moving portion 501 pivots about the first axis of the pivot component 56. Alternatively, the first and second photodetectors 58 and 59 are mounted about an other than outer surface of the canopy in such a manner that other than light impacting the outer surface of the canopy is received thereby. Alternatively, at least one of the first and second photodetectors 58 and 59 is mounted below the canopy adjacent a window therein for allowing light to pass therethrough.

For example, in a first predetermined mode of operation, the control circuit 57 samples photocurrents provided from the first and second photodetectors 58 and 59. The control circuit 57 determines relative amplitude between the photocurrents and in response to the determined relative amplitude provides a control circuit for causing the actuator 55 to move the canopy 51 in the direction toward the photodetector providing more photocurrent, until a point is reached wherein the amplitude of the photocurrents generated by each of the photodetectors is approximately equal. Thus, in the first mode of operation, the canopy 51 is spatially oriented in first and second directions in an attempt to equalize the photocurrents generated by each of the photodetectors. Alternatively, different photodetector placement and control criteria are implemented within the control circuit 57 to, for example, position the canopy 51 in such a manner as to detect a least amount of photocurrent.

Thus, when the apparatus shown in FIG. 5 is mounted to a moving vehicle frame member 53 using a clamping mechanism as part of the fixed portion 54, movement of the vehicle with respect to the sun, or other light source, results in automated movement of the canopy 51 with respect to the fixed portion 54 in response to the control signal from the control circuit 57. One of skill in the art will understand that the movement described above is in response to the control circuit satisfying a design goal of equalizing photocurrents generated by each of the photodetectors.

Figure 6:
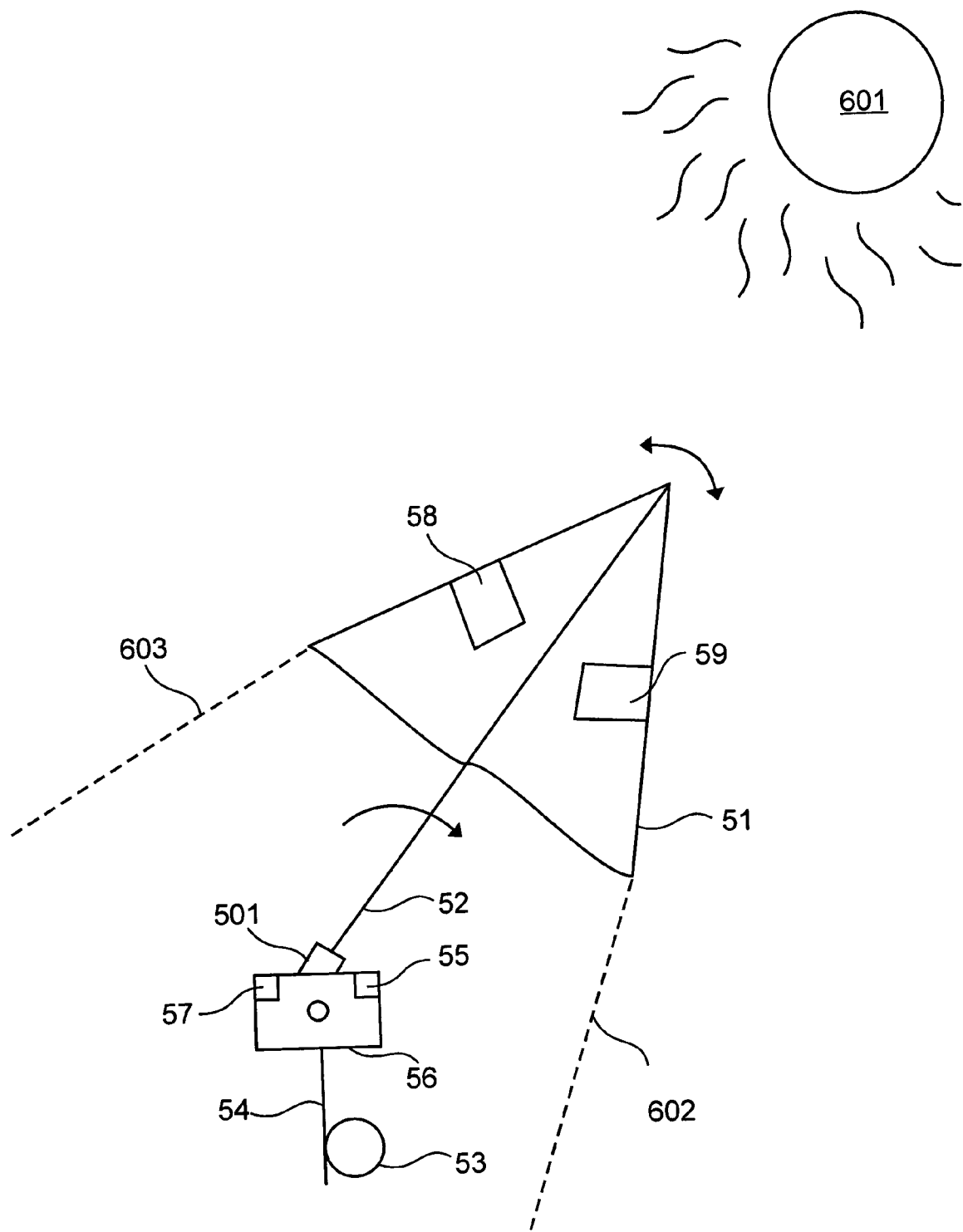
FIG. 6 illustrates a positional change of a canopy from an initial position shown in FIG. 5 to a new position when the canopy is provided with sunlight.

Alternatively, another design goal is implemented when the photodetectors are different or differently oriented relative to the canopy. Referring to FIG. 6, the sun 601, or other light source, provides light that is incident on both photodetectors 58 and 59. Using an initial position as shown in FIG. 5, the control circuit 57 receives both photocurrents and generates a control signal having such a polarity that the actuator 55 automatically re-positions the canopy 51, with respect to the fixed portion 54, in such a manner that the canopy automatically arrives at an other than initial position. In this other than initial position shade from the light source is provided under the canopy between shade lines 602 and 603, as shown in FIG. 6. In this other than initial position, each of the photodetectors are illuminated by substantially a same amount of light and movement of the canopy 51 with respect to the fixed portion 54 is approximately stopped. In this approximately stopped position, the control circuit 57 either generates a control signal that changes polarities at a rate that is insufficient to cause substantial displacement of the actuator 55 in either the first or second directions, or the magnitude of the control signal is decreased sufficiently to provide other than sufficient power to move the actuator 55 substantially as the difference in photocurrents observed on each of the photodetectors is approximately zero. Of course, the difference in photocurrents observed on each of the photodetectors is optionally in accordance with other predetermined design goals of the control circuit.

Figure 7A:
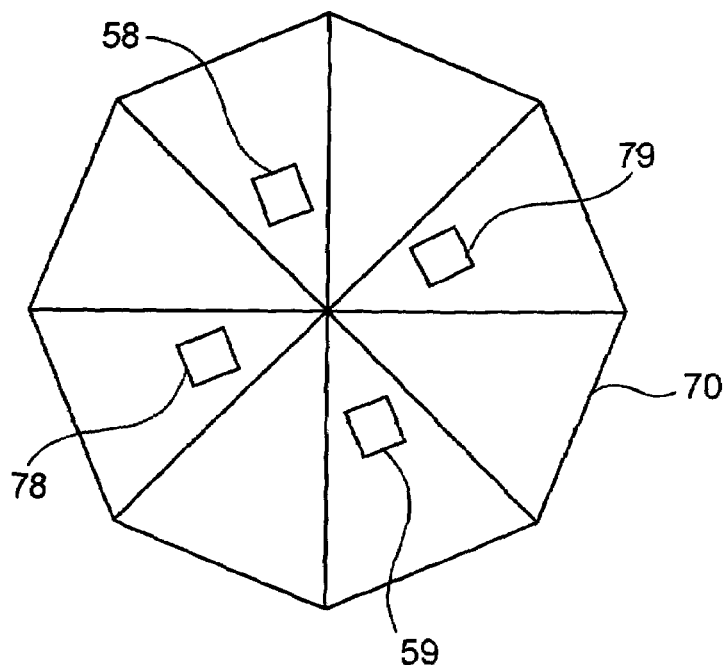
FIG. 7a illustrates a spatial orientation of photodetectors on a canopy.

Referring to FIG. 7a, the orientation of a first pair of photodetectors 58, 59, and a second pair of photodetectors 78, 79 are shown. The first pair of photodetectors 58 and 59 are for generating photocurrents that are for use by the control circuit to provide a control signal for positioning the canopy 70 about a first axis and the second pair of photodetectors 58 and 59 are for generating photocurrents that are for use by the control circuit to provide a control signal for positioning the canopy 70 about a second axis. Preferably the first and the second axes are orthogonal one to the other.

Figure 8:
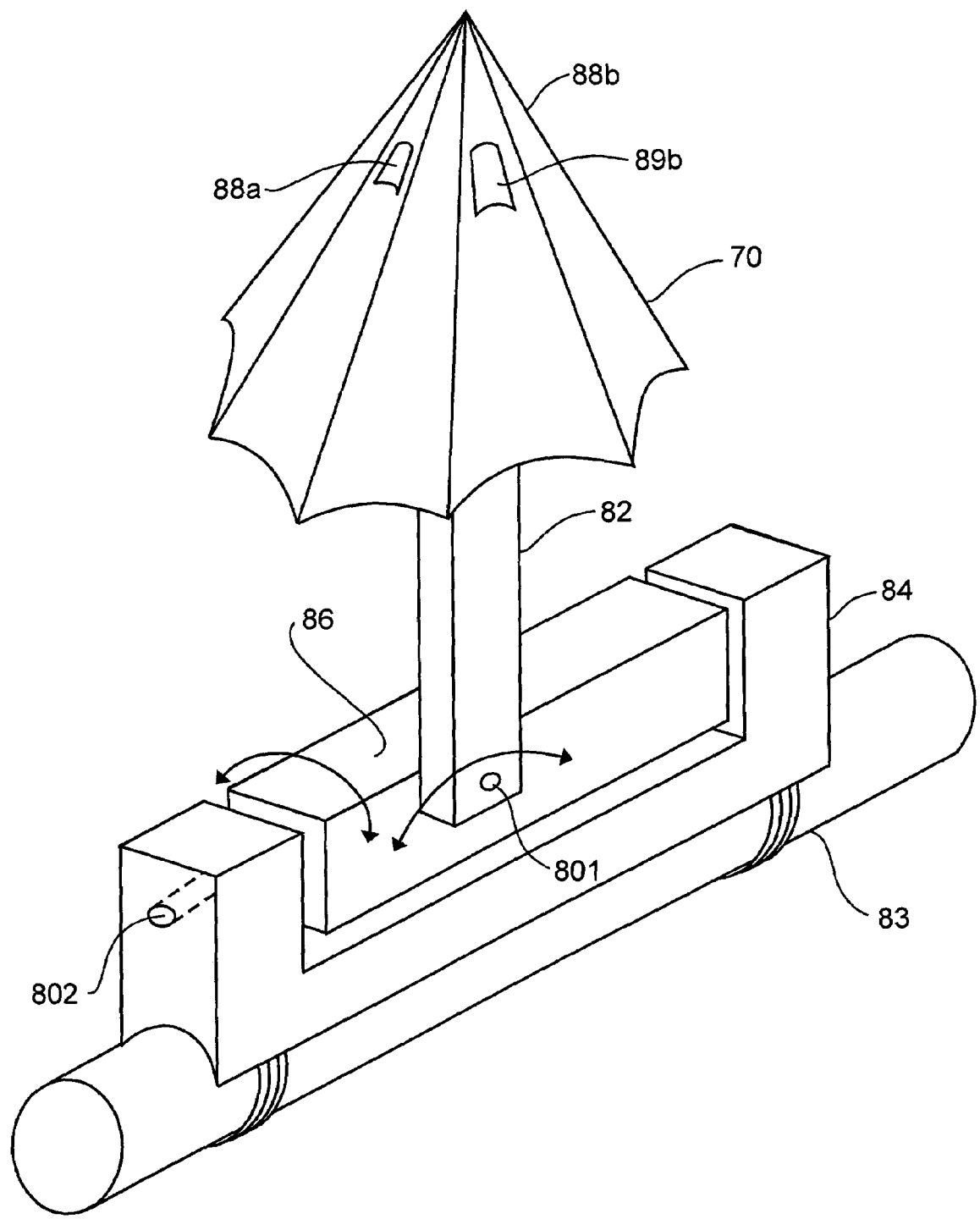
FIG. 8 illustrates a dual axis pivot component.

In FIG. 8, a dual axis pivot component 86 is shown, mounted to a fixed portion 84 that is mounted to a frame 83 of an object. An umbrella shaft 82 is pivotally mounted to the dual axis pivot component 86. The dual axis pivot component comprises actuators. the actuator are for pivoting the canopy 70 about a first axis 801 and a second axis 802, with respect to the fixed portion 84. Preferably, the photodetectors shown in FIG. 7a are oriented on the canopy 70 in such a manner that the first pair of photodetectors, photodetectors 88a and 88b, are positioned substantially parallel to an arc swept by the umbrella shaft when the umbrella shaft moves about the first axis 801 and that the second pair of photodetectors, photodetector 89b and another photodetector (not shown), are positioned substantially parallel to an arc swept by the umbrella shaft when the umbrella shaft moves about the second axis 802.

Thus, the umbrella shaft 82 moves about the two orthogonal axes 801 and 802 in response to first and second control signals generated by the control circuit (not shown). The control circuit shown in FIG. 4 is optionally employed and provided with an additional two photodetectors and an additional actuator in order to facilitate movement of the umbrella shaft about the two axes. When the canopy 70 is provided with light from a light source, such as the sun, the first and second control signals provided to first and second actuators, respectively, result in the canopy 70 of the umbrella automatically orienting itself toward the sun in a manner in accordance with predetermined design goals. Preferably, the shaded area under the canopy provides shade in a desired location as a result of the spatial orienting of the canopy 70 with respect to the fixed portion 84. Alternatively, a single actuator is provided for orienting the canopy about both axes in response to the two control signals.

Figure 7B:
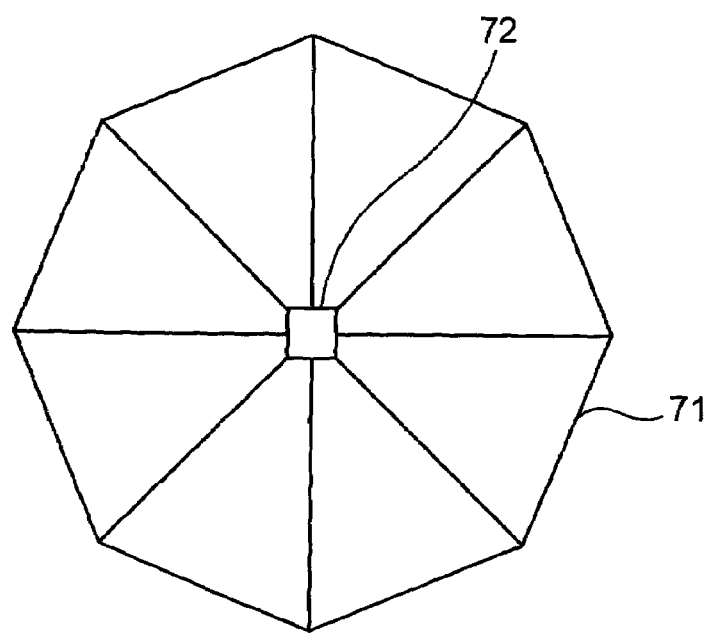
FIG. 7b illustrates an orientation of a single photodetector on a canopy.

Of course, instead of using the circuit shown in FIG. 4, optionally the circuit shown in FIG. 3 is utilized with the embodiment shown in FIG. 8. When using the control circuit shown in FIG. 3, a single photodetector 72 is provided on the canopy 71 or umbrella shaft (not shown). In this case however, when a single photodetector is used, as shown in FIG. 7b, it is more difficult to determine in which direction to actuate either of the actuators. As a result, for a single axis, the control circuit stores the photocurrent generated by the photodetector 72 in a current orientation of the canopy 70, orients the canopy in a first direction, stores the photocurrent generated by the photodetector 72 in this new orientation, then determines whether the stored photocurrent is larger for the orientation of the canopy in the current orientation or the new orientation, and generates a control signal provided to the actuator to position the canopy in such a manner so that the photocurrent generated by the photodetector 72 is in accordance with predetermined parameters set forth within the control circuit. For a dual axis system, this same process is repeated for pivoting of the canopy 70 about the second axis 802. However, using a single photodetector is less preferable than using two photodetectors per axis. When two photodetectors are employed for each axis, an immediate gradient is observed for that axis by measuring a difference in the magnitudes of each of the photocurrents within the control circuit.

Figure 9:
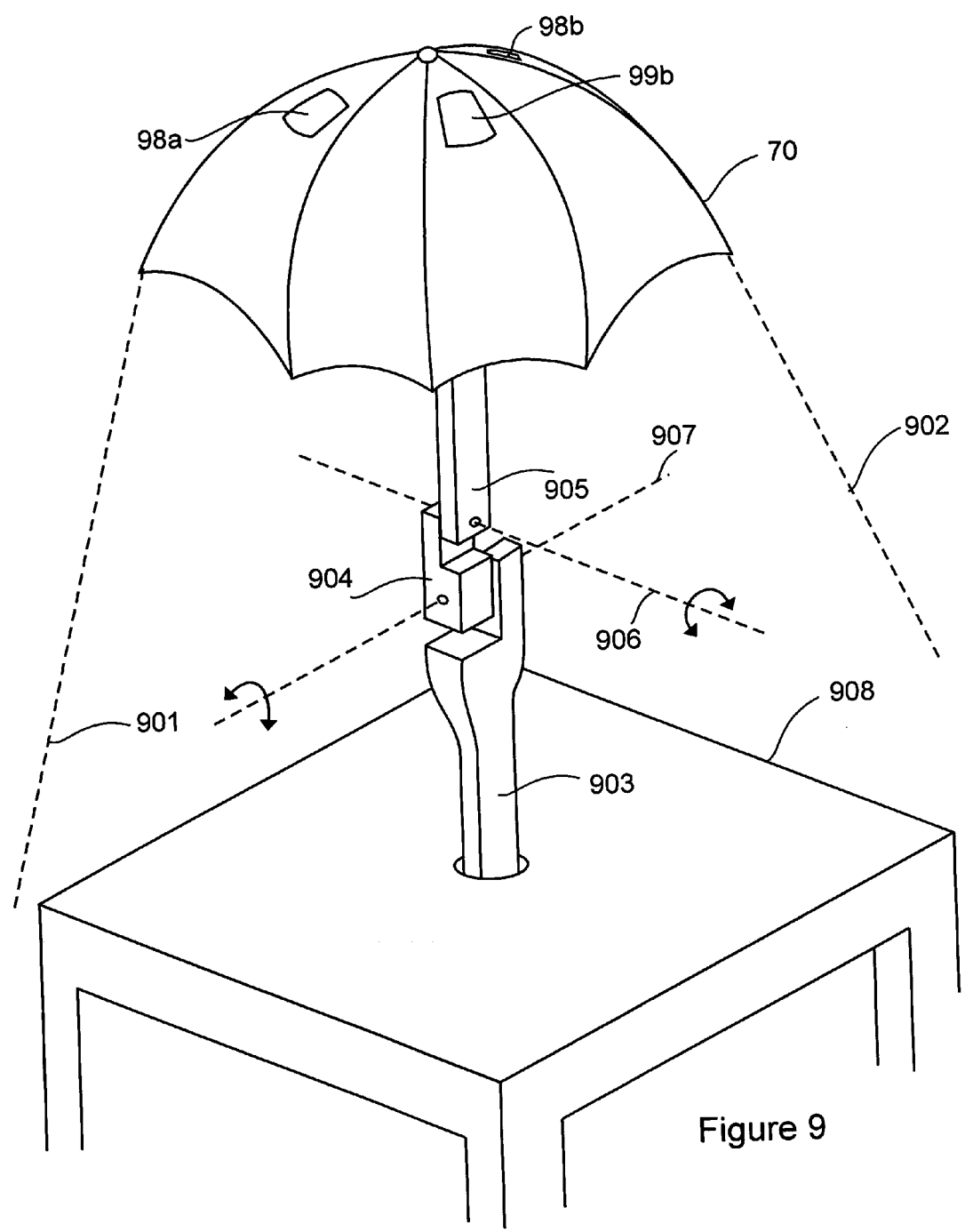
FIG. 9 illustrates a variation of the dual axis pivot component shown in FIG. 8.

Referring to FIG. 9, a variation of the dual axis pivot mechanism is shown for a solar umbrella for use with a table 908. A dual axis pivot component is provided between a fixed portion 903 and an umbrella shaft 905. The fixed portion 903 is mounted to the table 908. The dual axis pivot component has an intermediate component 904, thus the umbrella shaft 90 is pivotally mounted to the intermediate component 904, for pivoting about a first axis 906 with respect to the intermediate component 904, and the intermediate component 904 is pivotally mounted to the fixed portion 903 for pivoting about a second axis 907 with respect to the fixed portion 903. Preferably, the first and the second axes 906 and 907 are orthogonal. At an end of the umbrella shaft 905, other than the end that is pivotally mounted to the intermediate component 904, a canopy 70 is disposed. The umbrella shaft 905 has a mechanism for allowing movement of the canopy 70 between an open position and a closed position.

Two actuators (not shown) are provided for pivoting of the canopy 70 about the first axis 906 and the second axis 907 in response to photocurrents generated by photodetectors 98a and 98b (hidden in FIG. 9), and photodetectors 99a (hidden in FIG. 9) and 99b. Preferably the photodetectors such as those shown in FIG. 7a are oriented on the canopy 70 in such a manner that the first pair, photodetectors 98a and 98b, are positioned substantially parallel to an arc swept by the umbrella shaft when the umbrella shaft pivots about the first axis 906 and that the second pair, photodetector 99b and another photodetector (not shown), are positioned substantially parallel to an arc swept by the umbrella shaft when the umbrella shaft pivots about the second axis 907. A control circuit (not shown) is provided for receiving the photo currents from each of the photodetectors and for generating the control signal for provision to the actuators. Thus, in use, the actuators automatically orient the canopy 70 with respect to the table 908 in accordance with predetermined criteria set forth within the control circuit. The canopy 70 provides shade within a shaded area between shadow lines 901 and 902.

Preferably, the shaded area varies its position with respect to the canopy as the orientation of the table with respect to the sun is varied thus providing shade to the table at a similar location as the orientation of the table to the sun changes.

Figure 10:
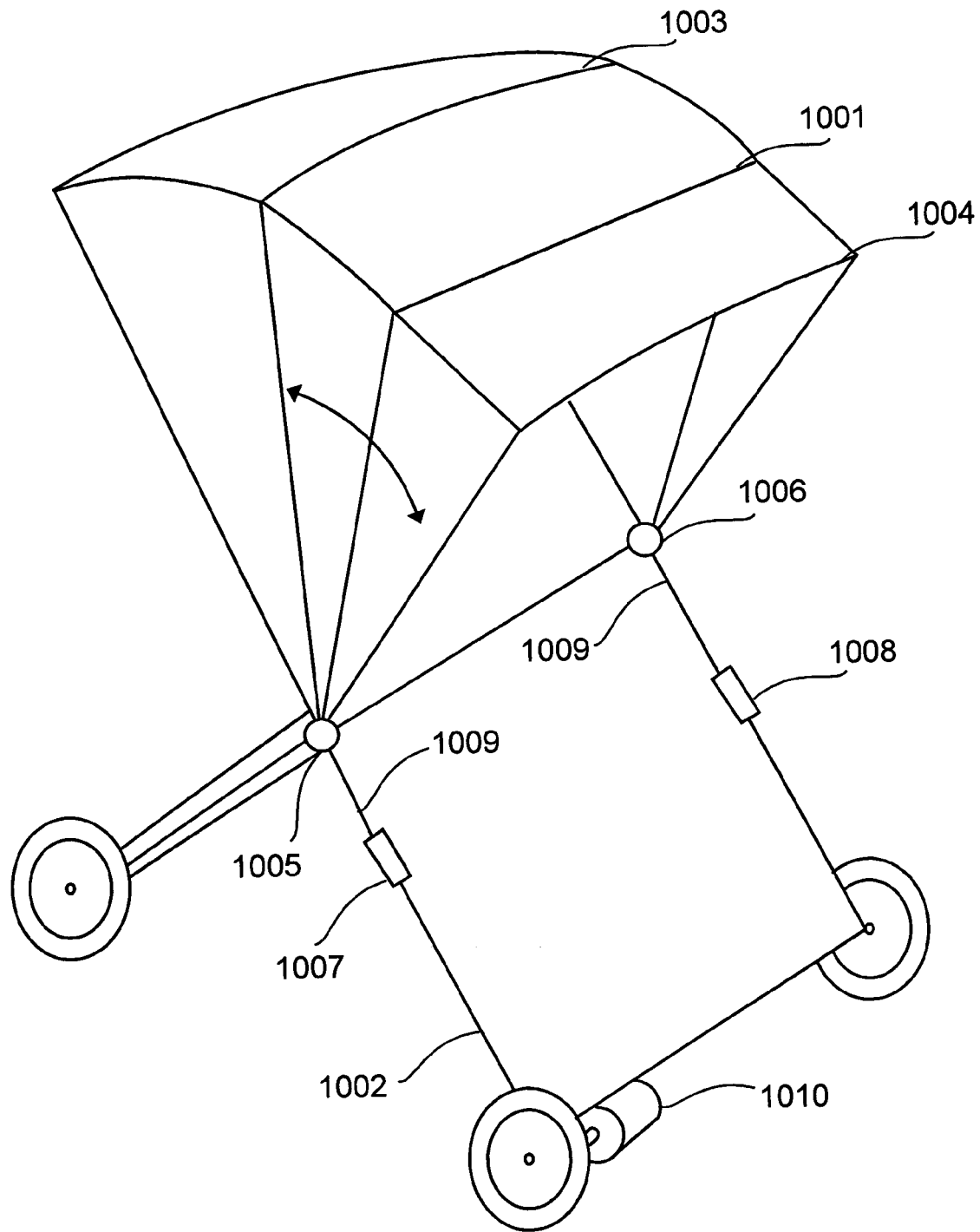
FIG. 10 illustrates a stroller equipped with an automated canopy positioning system; and, FIG. 11 illustrates an umbrella having a variation of the dual axis pivot component shown in FIG. 9.

Referring to FIG. 10, a further embodiment of the invention is shown. In this embodiment a stroller 1002 is provided with a canopy 1001 pivotally mounted to a frame portion 1009 of the stroller about pivot points 1005 and 1006. The canopy 1001 exhibits actuated movement with respect to the stroller 1002 between first and second positions 1003 and 1004, respectively. Photodetectors 1007 and 1008 are disposed on at least one of a frame portion of the stroller and on the canopy to detect light and to generate photocurrent in response thereto. A control circuit (such as the one illustrated in FIG. 4) is used to receive this photocurrent and to provide a control signal for actuating movement of the canopy. For powering of the control circuit an optional generator 1010 is installed with its stator coupled to the frame portion 1009 and its armature coupled to a wheel on the stroller. Thus, movement of the stroller results in rotation of the armature, which in turn provides electrical energy to the control circuit. Optionally, an energy storage device in the form of a battery is provided for storing energy and for powering of the control circuit and actuator when the stroller is stationary.

Figure 11:
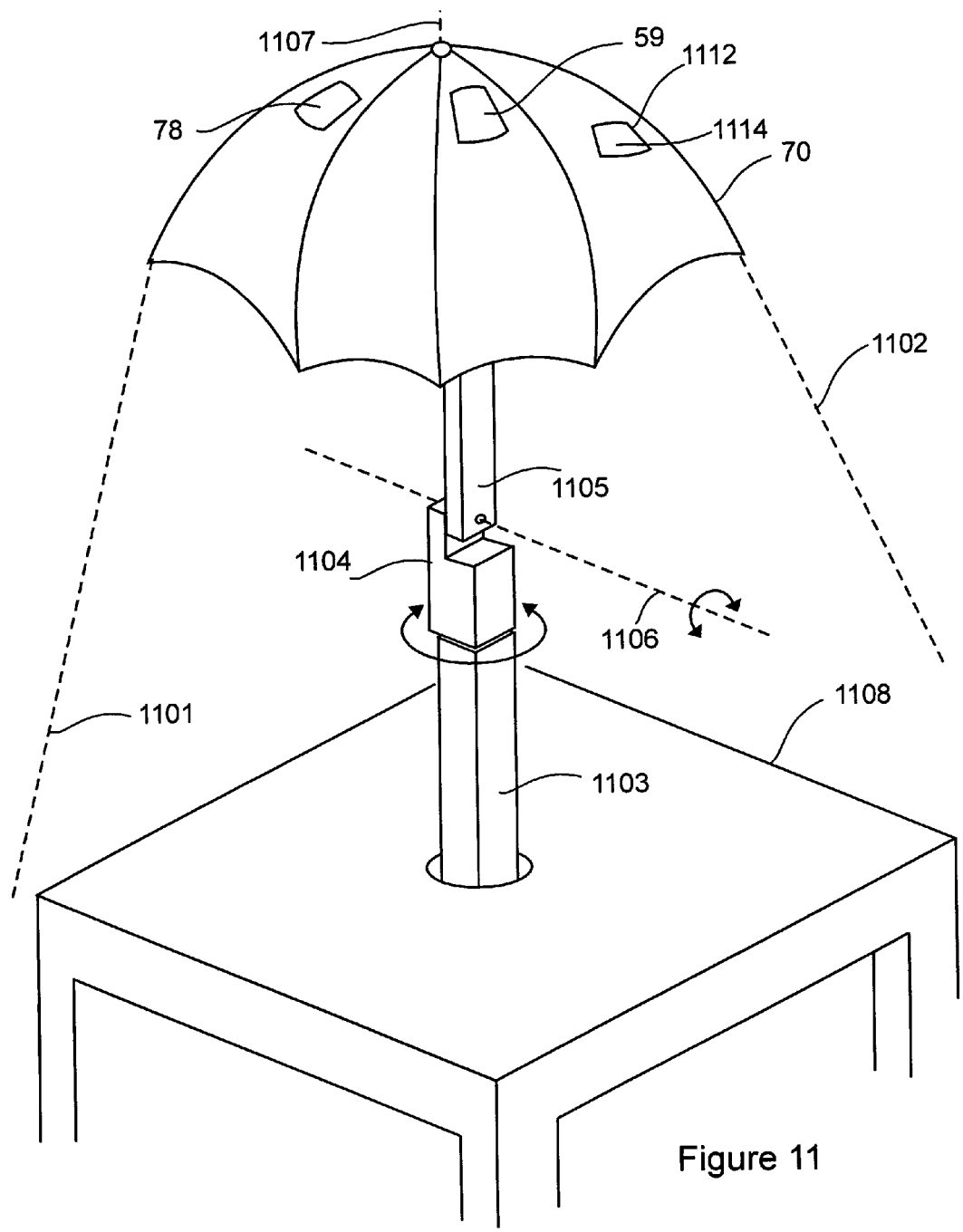

Referring to FIG. 1, a further embodiment of the invention is shown. In accordance with this embodiment, a variation of the dual axis pivot mechanism is shown for a solar umbrella for use with a table 1108. In this case a dual axis pivot component is provided between a fixed portion 1103 and an umbrella shaft 1105. The fixed portion 1103 is mounted to the table 1108. The dual axis pivot component has an intermediate component 1104, thus the umbrella shaft 1105 is pivotally mounted to the intermediate component 1104, for pivoting about a first axis 1106 with respect to the intermediate component 1104, and the intermediate component 1104 is pivotally mounted to the fixed portion 1103 for pivoting about a second axis 1107 with respect to the fixed portion 1103. Preferably, the first and the second axes 1106 and 1107 are orthogonal. At an end of the umbrella shaft 1105, other than the end that is pivotally mounted to the intermediate component 1104, a canopy 70 is disposed. The umbrella shaft 1105 preferably includes a mechanism for allowing movement of the canopy 70 between an open position and a closed position. Two actuators (not shown) are provided for pivoting of the canopy 70 about the first axis 1106 and the second axis 1107 in response to photocurrents generated by photodetectors 78 and 59, and photodetectors 58 and 79 (occluded in FIG. 11).

Alternatively, the canopy includes a switch actuated by opening and closing of the canopy. Thus in a first open position the switch is actuated and electrical energy from a power source is provided to the control circuit. In a second closed position electrical energy from the power source is other than provided to the control circuit.

Alternatively, a rain sensor 1112, and a rain detection circuit 1114, is provided for detecting whether the upper surface of the canopy is subjected to rain. If a determination is made that rain is present then the rain sensor provides a rain signal to the control circuit. The control circuit in response to the rain signal provides control signals for moving the canopy to a covering position. For an umbrella type canopy, this is an upright position for the support shaft.

Of course, the optical sensors need not be disposed on the umbrella canopy. Optionally they are disposed on other than the canopy of the umbrella in such an orientation that they detect one of shade within the shaded area formed by the canopy and an angle of light impacting the canopy. Thus, moving of the canopy need not result in motion of the photodetectors.

Advantageously, by providing an automated system for positioning of the canopy with respect to an object, manually orienting of the canopy is for the most part obviated.

Preferably, the control circuit is powered by solar power or stroller motion, obviating the need for extension cords and batteries. Further, this results in an environmentally friendly automated canopy positioning system. Alternatively, the positioning system is powered by a portable power source in the form of a battery. Further alternatively, the positioning system is powered by a power grid.

Numerous other embodiments may be envisaged without departing from the spirit or scope the invention.

What is claimed is:

1. A method of spatially orienting a canopy comprising:
   detecting an orientation of a light source relative to the canopy;
   moving of the canopy by pivoting shaft of canopy in dependence upon the detected orientation, the canopy positioned for providing a shade under the canopy;
   maintaining the shade about an approximately predetermined location relative to which the canopy is moved; and,
   initiating the method when the canopy is moved from a first closed position to a second open position, the second open position for providing a shaded region of a first area and the first closed position for providing a shaded region of a size substantially smaller than the first area.

2. A method according to claim 1 wherein detecting comprises:

sampling an intensity of light to determine a first magnitude;
automatically moving the canopy in a first direction;
sampling an intensity of light to determine a second magnitude; and,
determining a larger magnitude between the first magnitude and the second magnitude.

3. A method according to claim 2 wherein moving comprises automatically moving the canopy in a second direction, other than the first direction, when the determination is that the second magnitude is less than the first magnitude.

4. A method according to claim 3 wherein automatically moving is performed until one of the first magnitude and the second magnitude is maximized.

5. A method according to claim 1 comprising:
detecting a presence of rain; and,
moving the canopy into a predetermined fixed position when rain is detected.

6. An apparatus comprising:
a canopy having an upper surface and a lower surface for providing shade to a shaded area opposing the lower surface in response to light impacting the upper surface, the canopy having a first position in which the canopy is in a closed state and a second position in which the canopy is in an open state;
a first photodetector for detecting at least one of an amount of light in the shaded area and an amount of light impacting the canopy upper surface, the detector for generating a photocurrent in response to light incident thereon;
a control circuit for receiving the photocurrent and for generating a first control signal in dependence thereon;
a positioning mechanism having a fixed portion and having a moving portion coupled with the canopy for spatially orienting by pivoting shaft of canopy relative to the fixed portion about at least an axis in response to the control signal for, in use, when the canopy is in the second position providing signals to the positioning mechanism to maintain at least a portion of the shaded area in an approximately predetermined spatial orientation relative to the fixed portion and, when the canopy is in the first position other than providing signals to the positioning mechanism.

7. An apparatus according to claim 6 wherein the first photodetector is disposed on the upper surface of the canopy.

8. An apparatus according to claim 6 wherein the first photodetector is disposed on other than the canopy and does not move in response to actuated movement of the canopy with respect to the fixed portion.

9. An apparatus according to claim 8 wherein the first photodetector is disposed in the shaded area.

10. An apparatus according to claim 6 wherein the fixed portion comprises a releasable mount.

11. An apparatus according to claim 6 wherein the fixed portion for coupling to a portion of a fixture that is other than a vehicle.

12. An apparatus according to claim 6 wherein the fixed portion is for installation in a permanent fashion.

13. An apparatus according to claim 6 comprising a rain sensor, the rain sensor electrically coupled to the control circuit for detecting whether the outer surface of the canopy is subject to rain and for providing a rain signal in dependence thereon.

14. An apparatus according to claim 13 wherein the control circuit comprises a rain detection circuit for receiving the rain signal and, when the rain signal is indicative of rain, for providing a rain control signal for moving the canopy into a predetermined fixed position.

* * * * *